United States Patent [19]

Rindler et al.

[11] Patent Number: 5,618,463
[45] Date of Patent: Apr. 8, 1997

[54] ICE BALL MOLDING APPARATUS

[76] Inventors: Joe Rindler; Nanci Pintavalli, both of 5731 Henderson Dr., Delaware, Ohio 43015

[21] Appl. No.: 351,952

[22] Filed: Dec. 8, 1994

[51] Int. Cl.$^6$ ............................................. A23B 7/16
[52] U.S. Cl. .................. 249/92; 249/91; 426/66; 426/67; 426/68; 426/91; 426/134; 426/421; 426/515
[58] Field of Search .................. 249/92, 91, 93; 426/66, 67, 68, 91, 134, 421, 515

[56] References Cited

U.S. PATENT DOCUMENTS

| | | | |
|---|---|---|---|
| 1,835,719 | 12/1931 | Parr | 426/134 |
| 2,217,700 | 10/1940 | Musher | 426/91 |
| 3,565,389 | 2/1971 | Price | 249/128 |
| 4,157,805 | 6/1979 | Haber et al. | 249/91 |
| 4,165,061 | 8/1979 | Kupperman et al. | 249/92 |
| 4,239,175 | 12/1980 | Straubinger | 249/121 |
| 4,436,276 | 3/1984 | Donahue | 249/91 |
| 4,656,928 | 4/1987 | Mack | 426/515 |
| 4,974,809 | 12/1990 | Lipke et al. | 249/82 |
| 5,198,127 | 3/1993 | Tilley et al. | 249/92 |

Primary Examiner—Thomas R. Weber

[57] ABSTRACT

An ice molding apparatus includes a first mold assembly which includes a first hollow chamber portion and which includes a spike assembly which projects inward from a wall of the first hollow chamber portion. The spike assembly includes a distal end adapted to support a quantity of solid material. The first mold assembly includes a first joint member adapted to connect to a second mold assembly. The second mold assembly includes a second hollow chamber portion which includes a filler channel adapted for passing a quantity of liquid water therethrough into the second hollow chamber portion and to fill up the first hollow chamber portion with water. The second mold assembly includes a second joint member adapted to connect to the first joint member, such that the first hollow chamber portion and the second hollow chamber portion form a combined interior mold chamber. The distal end of the spike assembly is located adjacent to a center portion of the combined interior mold chamber. The distal end of the spike assembly includes material-gripping ridges. A first stacking assembly, which includes stacking protuberances, is connected to the first mold assembly. A second stacking assembly, which includes wells complementary to the protuberances, is connected to the second mold assembly. The first and second assemblies are stacked in head-to-tail fashion.

6 Claims, 2 Drawing Sheets

ICE BALL MOLDING APPARATUS

BACKGROUND OF THE INVENTION

1. Field of the Invention

The present invention relates generally to molds for forming ice items, and, more particularly, to a mold especially adapted for encasing solid food in an ice item.

2. Description of the Prior Art

Food that is in the form of ice takes a number of forms such as an ice confection on a stick and an ice confection in a plastic bag. Throughout the years, a number of innovations have been developed relating to molds for ice items, and the following U.S. patents are representative of some of those innovations: 3,565,389; 4,165,061; 4,239,175; 4,974,809; and 5,198,127. If desired, the above-mentioned devices can be used for freezing either an aqueous liquid alone or a suspension of solid pieces in an aqueous liquid.

However, a significant problem often occurs when an attempt is made to freeze suspended solid material in a liquid in a mold. Often, the solid material settles to the bottom of the liquid in the mold before freezing of the liquid takes place. After the freezing takes place, an ice item is formed which contains the original solid material therein. The ice item is then removed from the mold. If the solid-material-containing ice item is dropped into a quantity of liquid water to float therein, the ice item often orients itself so that the solid material is on the top of the ice item as the ice item floats in the water.

A use of ice items that is of special interest is the use that zoos have for ice items. For example, many zoos make solid ice balls out of diluted blood or fruit juices to motivate their carnivores and primates. These ice balls stimulate the animals to be very active and obtain desired exercise. Conventionally, to make these ice balls, a quantity of food and liquid is placed in a balloon, and the balloon is filled with water. This method is very cumbersome, time consuming, and often leads to a mess from a burst balloon. In view of the above, it would be desirable if an ice mold were provides that is not readily susceptible to bursting when filled with water.

When using a balloon as an ice mold as described above, any solid food that is placed in the balloon often sinks to the bottom of the balloon when before freezing takes place. As a result, when the ice ball is placed in water, the solid food often is oriented at the top of the floating ice ball. As a consequence, an animal can get to the food relatively easily, and as soon as they do, they lose interest in the ice ball. In view of the above, it would be desirable if an ice mold were provided that prevents a solid food item from sinking to the bottom of an ice mold before the surrounding liquid water in the mold is frozen. Moreover, it would also be desirable if an ice mold were provided that produces an ice ball in which solid food in the ice ball is not oriented at the top of the ice ball when the ice ball is floating in water.

For ice balls that are not placed in water to float, it would be desirable for solid food to be encased near the center of the ice ball. It is well known that some dogs often enjoy playing with simple ice cubes in summer. If food were encased in an ice ball, the animal could derive even more play. Furthermore, if a dog or other animal plays with an ice ball, it would be desirable if a maximum amount of play were obtained out of an individual ice ball. To assure a maximum amount of play, solid food should be located at the center of the ball.

Still other features would be desirable in an ice ball molding apparatus. For example, for convenience in storage, it would be desirable if a plurality of ice ball molding apparatuses could be stacked together when not in use. Furthermore, when ice ball molding apparatuses are in a freezer undergoing a freezing operation, it would also be desirable if a plurality of ice ball molding apparatuses could be stacked.

Although it has been mentioned that it would be desirable to encase solid food in an ice ball, it may also be desirable to encase other solid items in an ice ball, such as a solid toy. Therefore, it would be desirable if an ice ball molding apparatus were provided that permits a solid toy to be encased in an ice ball.

Thus, while the foregoing body of prior art indicates it to be well known to use ice balls and indicates it to be well known to use molds to make molded ice items, the prior art described above does not teach or suggest an ice ball molding apparatus which has the following combination of desirable features: (1) is not readily susceptible to bursting when filled with water; (2) prevents a solid food item from sinking to the bottom of an ice mold before the surrounding liquid water in the mold is frozen; (3) produces an ice ball in which solid food in the ice ball is not oriented to the top of the ice ball when the ice ball is floating in water; (4) encases solid food inside an ice ball near the center of the ice ball; (5) can be stacked together with other apparatuses when not in use; (6) provides that a plurality of ice ball molding apparatuses can be stacked when the ice ball molding apparatuses are in a freezer undergoing a freezing operation; and (7) permits a solid toy to be encased in an ice ball. The foregoing desired characteristics are provided by the unique ice ball molding apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides an ice molding apparatus which includes a first mold assembly which includes a first hollow chamber portion, which includes a spike assembly which projects inward from a wall of the first hollow chamber portion. The spike assembly includes a distal end adapted to support a quantity of solid material. The first mold assembly includes a first joint member adapted to connect to a second mold assembly. The second mold assembly includes a second hollow chamber portion which includes a filler channel adapted for passing a quantity of liquid water therethrough into the second hollow chamber portion and into the first hollow chamber portion. The second mold assembly includes a second joint member adapted to connect to the first joint member, such that the first hollow chamber portion and the second hollow chamber portion form a combined interior mold chamber. The distal end of the spike assembly is located adjacent to a center portion of the combined interior mold chamber. The distal end of the distal end includes material-gripping ridges.

The first mold assembly includes a threaded channel portion, and the spike assembly includes a threaded plug portion. A spike portion is connected to the threaded plug portion. The threaded plug portion is adapted to be screwed into the threaded channel portion of the first mold assembly for installing the spike assembly into the first mold assembly.

A first stacking assembly is connected to the first mold assembly. The first stacking assembly includes protuberances, and a second stacking assembly is connected to the second mold assembly. The second stacking assembly includes wells which are complementary to the protuberances and are adapted to receive the protuberances when a first stacking assembly is stacked on a second stacking assembly. The first stacking assembly is connected to the first mold assembly, and the second stacking assembly is connected to the second mold assembly such that a first stacking assembly is registrable with a second stacking assembly, whereby protuberances of the first mold assembly can be placed in wells of the second mold assembly when a first stacking assembly is stacked on a second stacking assembly. The first stacking assembly and the first mold assembly are formed as a unified, integrated structure. Also, the second stacking assembly and the second mold assembly are formed as a unified, integrated structure.

The first mold assembly is substantially hemispherically-shaped; the second mold assembly is substantially hemispherically-shaped; and the combined interior mold chamber is substantially spherically-shaped. A portion of the distal end of the spike assembly is located at a center region of the spherically-shaped combined interior mold chamber.

The first joint member includes a first joint thread, and the second joint member includes a second joint thread which is complementary to the first joint thread.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved ice ball molding apparatus which has all of the advantages of the prior art and none of the disadvantages.

It is another object of the present invention to provide a new and improved ice ball molding apparatus which may be easily and efficiently manufactured and marketed.

It is a further object of the present invention to provide a new and improved ice ball molding apparatus which is of durable and reliable construction.

An even further object of the present invention is to provide a new and improved ice ball molding apparatus which is susceptible of a low cost of manufacture with regard to both materials and labor, and which accordingly is then susceptible of low prices of sale to the consuming public, thereby making such ice ball molding apparatus available to the buying public.

Still yet a further object of the present invention is to provide a new and improved ice ball molding apparatus which is not readily susceptible to bursting when filled with water.

Still another object of the present invention is to provide a new and improved ice ball molding apparatus that prevents a solid food item from sinking to the bottom of an ice mold before the surrounding liquid water in the mold is frozen.

Yet another object of the present invention is to provide a new and improved ice ball molding apparatus which produces an ice ball in which solid food in the ice ball is not oriented to the top of the ice ball when the ice ball is floating in water.

Even another object of the present invention is to provide a new and improved ice ball molding apparatus that encases solid food inside an ice ball near the center of the ice ball.

Still a further object of the present invention is to provide a new and improved ice ball molding apparatus which can be stacked together with other apparatuses when not in use.

Yet another object of the present invention is to provide a new and improved ice ball molding apparatus that provides that a plurality of ice ball molding apparatuses can be stacked when the ice ball molding apparatuses are in a freezer undergoing a freezing operation.

Still another object of the present invention is to provide a new and improved ice ball molding apparatus which permits a solid toy to be encased in an ice ball.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved ice ball molding apparatus embodying the principles and concepts of the present invention will be described.

Figure 1:
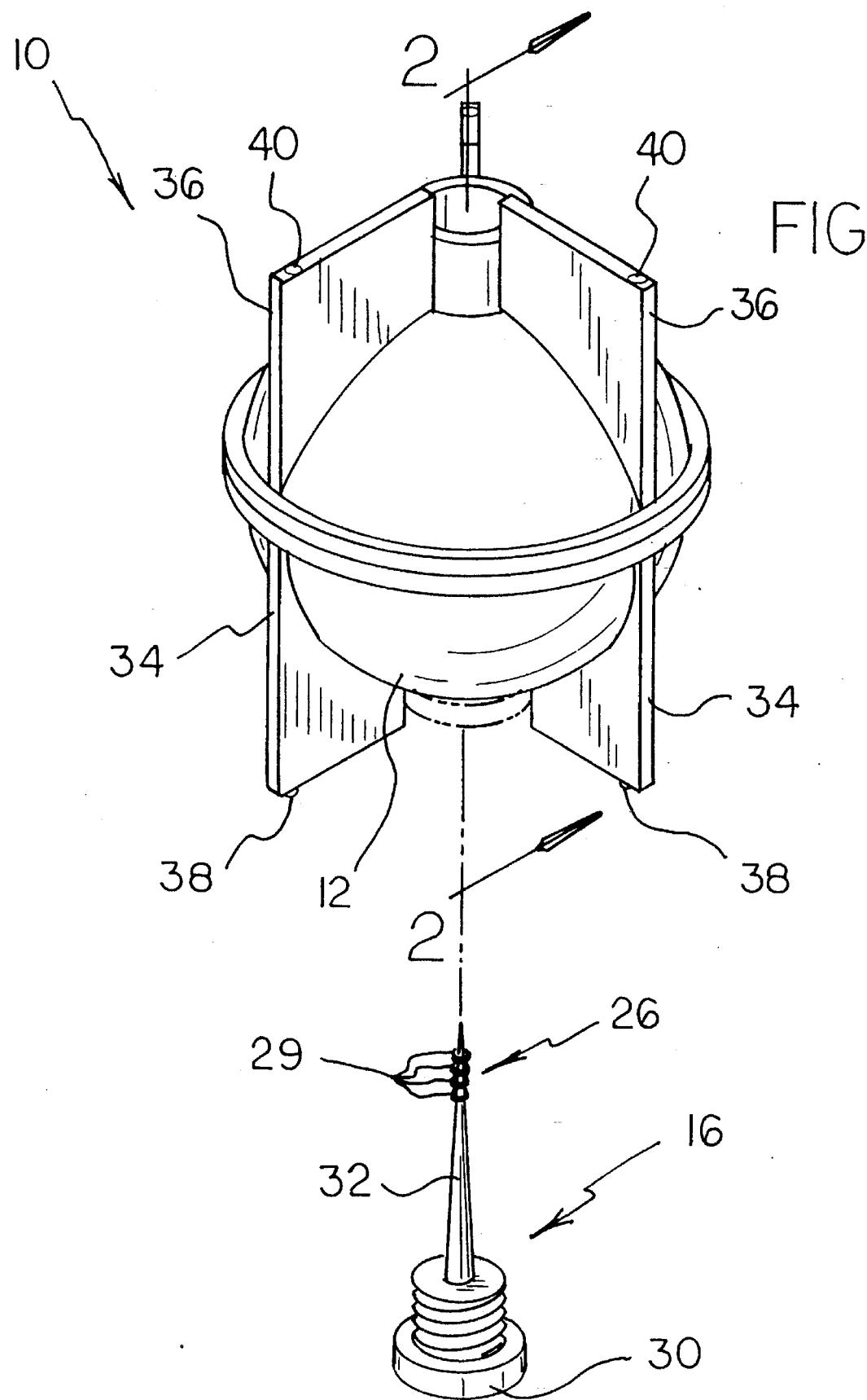
FIG. 1 is a perspective view, partially exploded, showing a preferred embodiment of the ice ball molding apparatus of the invention in an empty condition.
Figure 2:
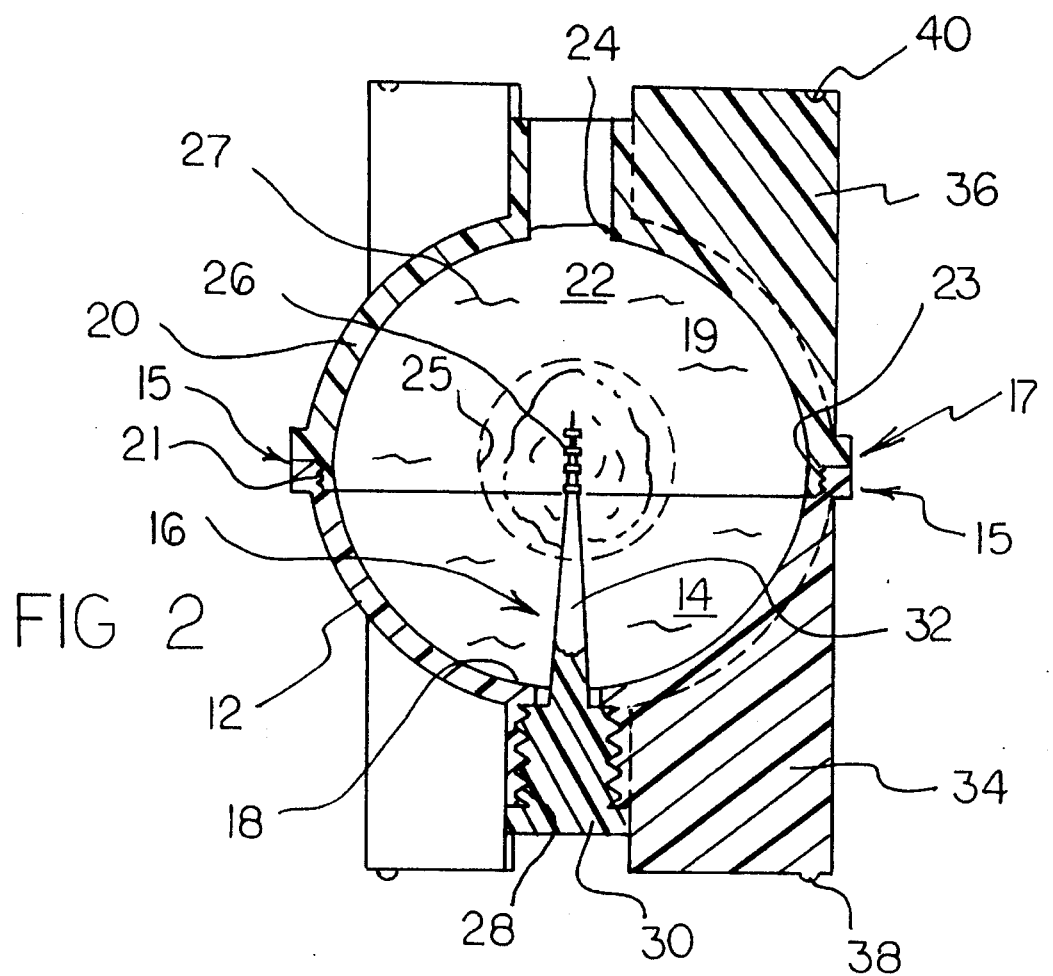
FIG. 2 is a cross-sectional view, not exploded, of the embodiment of the ice ball molding apparatus shown in FIG. 1 taken along line 2—2 of FIG. 1 having a solid food item and liquid water therein.
Figure 3:
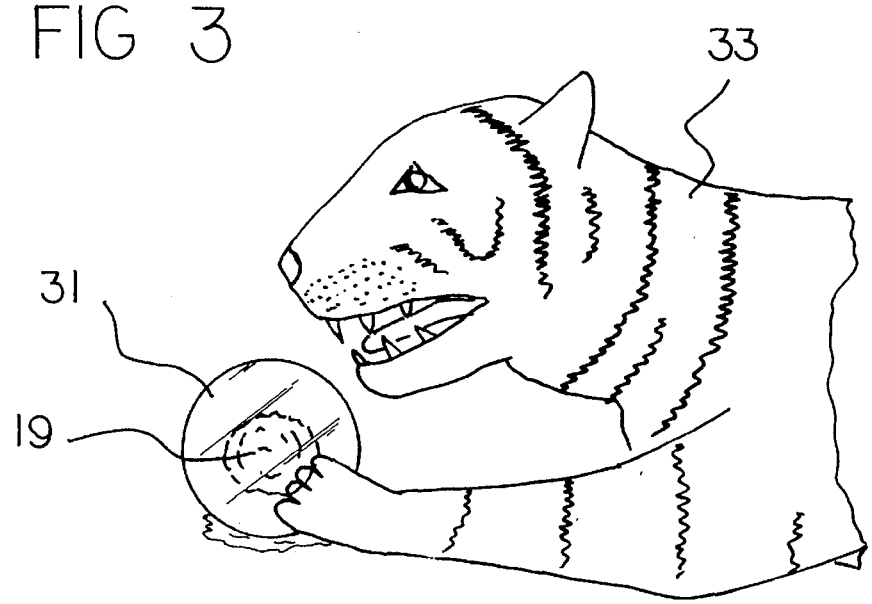
FIG. 3 is a side view of an ice ball made with the ice ball molding apparatus shown in FIG. 2 being played with by a tiger.

Turning to FIGS. 1–3, there is shown an exemplary embodiment of the ice ball molding apparatus of the invention generally designated by reference numeral 10. In its preferred form, ice ball molding apparatus 10 includes a first mold assembly 12 which includes a first hollow chamber portion 14, which includes a spike assembly 16 which projects inward from a wall 18 of the first hollow chamber portion 14. The spike assembly 16 includes a distal end 26 adapted to support a quantity of solid material 19. The first mold assembly 12 includes a first joint member 15 adapted to connect to a second mold assembly 20. The second mold assembly 20 includes a second hollow chamber portion 22 which includes a filler channel 24 adapted for passing a quantity of liquid water 27 therethrough into the second hollow chamber portion 22 and into the first hollow chamber portion 14. The second mold assembly 20 includes a second joint member 17 adapted to connect to the first joint member 15, such that the first hollow chamber portion 14 and the second hollow chamber portion 22 form a combined interior mold chamber. The distal end 26 of the spike assembly 16 is located adjacent to a center portion of the combined interior mold chamber. The distal end 26 of the distal end 26 includes material-gripping ridges 29.

The first mold assembly 12 includes a threaded channel portion 28, and the spike assembly 16 includes a threaded plug portion 30. A spike portion 32 is connected to the threaded plug portion 30. The threaded plug portion 30 is adapted to be screwed into the threaded channel portion 28 of the first mold assembly 12 for installing the spike assembly 16 into the first mold assembly 12.

A first stacking assembly 34 is connected to the first mold assembly 12. The first stacking assembly 34 includes protuberances 38, and a second stacking assembly 36 is connected to the second mold assembly 20. The second stacking assembly 36 includes wells 40 which are complementary to the protuberances 38 and are adapted to receive the protuberances 38 when a first stacking assembly 34 is stacked on a second stacking assembly 36. The first stacking assembly 34 is connected to the first mold assembly 12, and the second stacking assembly 36 is connected to the second mold assembly 20 such that a first stacking assembly 34 is registrable with a second stacking assembly 36, whereby protuberances 38 of the first mold assembly 12 can be placed in wells 40 of the second mold assembly 20 when a first stacking assembly 34 is stacked on a second stacking assembly 36.

As shown in the Figures, the first stacking assembly 34 and the second stacking assembly 36 are in the form of vanes. The first stacking assembly 34 and the first mold assembly 12 are formed as a unified, integrated structure. Also, the second stacking assembly 36 and the second mold assembly 20 are formed as a unified, integrated structure.

The first mold assembly 12 is substantially hemispherically-shaped; the second mold assembly 20 is substantially hemispherically-shaped; and the combined interior mold chamber is substantially spherically-shaped. A portion of the distal end 26 of the spike assembly 16 is located at a center region 25 of the spherically-shaped combined interior mold chamber. The combined interior mold chamber that is spherically-shaped provides ice balls when liquid water therein is frozen into ice.

The first joint member 15 includes a first joint thread 21, and the second joint member 17 includes a second joint thread 23 which is complementary to the first joint thread 21.

In using the ice ball molding apparatus 10 of the invention, the threaded plug portion 30 of the spike assembly 16 is screwed into threaded channel portion 28 of the first mold assembly 12. The threaded plug portion 30 can have a slot for receiving a screwdriver blade. A piece of solid material 19, which can be a piece of meat, is placed on the distal end 26 of the spike portion 32 of the spike assembly 16. The material-gripping ridges 29 serve to secure retention of the solid material 19 on the distal end 26 of the spike assembly 16. Then, the second mold assembly 20 is connected to the first mold assembly 12 by screwing the first joint thread 21 of the first joint member 15 together with the second joint thread 23 of the second joint member 17. The first joint member 15 and the second joint member 17 form a watertight seal. Then, liquid water 27 is poured through the filler channel 24 so that the entire combined interior mold chamber is filled with water. The solid material 19 is located at the center region 25 of the combined interior mold chamber.

Then, the entire ice ball molding apparatus 10 of the invention is placed in a freezer. The liquid water 27 freezes to encase the solid material 19 in an ice ball. When the ice ball molding apparatus 10 is removed from the freezer, the spike assembly 16 is unscrewed from the first mold assembly 12 leaving the solid material 19 frozen into the center region 25 of the combined interior mold chamber. Then, the second mold assembly 20 is unscrewed from the first mold assembly 12, and the released ice ball 31, containing the solid material 19 in the center therein, is given to an animal, such as tiger 33 shown in FIG. 3.

In stacking a plurality of ice ball molding apparatuses of the invention, the second stacking assembly 36 may be regarded as a head, and the first stacking assembly 34 may be regarded as a tail. A plurality of ice ball molding apparatuses are stacked in head-to-tail fashion whether for storing or for freezing.

The components of the ice ball molding apparatus of the invention can be made from inexpensive and durable plastic materials, especially recycles plastic materials. Recycled high density polyethylene is especially useful.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved ice ball molding apparatus that is low in cost, relatively simple in design and operation, and which may advantageously be used to provide an ice ball without being readily susceptible to bursting when filled with water. With the invention, an ice ball molding apparatus is provided which prevents a solid food item from sinking to the bottom of an ice mold before the surrounding liquid water in the mold is frozen. With the invention, an ice ball molding apparatus is provided which produces an ice ball in which solid food in the ice ball is not oriented at the top of the ice ball when the ice ball is floating in water. With the invention, an ice ball molding apparatus is provided which encases solid food inside an ice ball near the center of the ice ball. With the invention, an ice ball molding apparatus is provided which can be stacked together with other apparatuses when not in use. With the invention, an ice ball molding apparatus provides that a plurality of ice ball molding apparatuses can be stacked when the ice ball molding apparatuses are in a freezer undergoing a freezing operation. With the invention, an ice ball molding apparatus is provided which permits a solid toy to be encased in an ice ball.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. An ice molding apparatus, comprising:

a first mold assembly which includes a first hollow chamber portion, which includes a cylindrical spike assembly which projects inward from a wall of said first hollow chamber portion, said spike assembly including a distal end adapted to support a quantity of solid material, and which includes a first joint member adapted to connect to a second mold assembly, and a second mold assembly which includes a second hollow chamber portion, which includes a filler channel adapted for passing a quantity of liquid water therethrough into said second hollow chamber portion, and which includes a second joint member adapted to connect to said first joint member, such that said first hollow chamber portion and said second hollow chamber portion form a combined interior mold chamber, wherein said distal end of said cylindrical spike assembly is located adjacent to a center portion of said combined interior mold chamber, wherein said distal end of said cylindrical spike assembly includes material-gripping ridges, wherein said first mold assembly includes a threaded channel portion, and said spike assembly includes a threaded plug portion and a spike portion connected to said threaded plug portion, wherein said threaded plug portion is adapted to be screwed into said threaded channel portion of said first mold assembly for installing said spike assembly into said first mold assembly.

2. The ice molding apparatus of claim 1 further including:

a first stacking assembly connected to said first mold assembly, wherein said first stacking assembly includes protuberances, and a second stacking assembly connected to said second mold assembly, wherein said second stacking assembly includes wells which are complementary to said protuberances and are adapted to receive said protuberances when a first stacking assembly is stacked on a second stacking assembly, wherein said first stacking assembly is connected to said first mold assembly and said second stacking assembly is connected to said second mold assembly such that a first stacking assembly is registrable with a second stacking assembly, whereby protuberances of said first mold assembly can be placed in wells of said second mold assembly when a first stacking assembly is stacked on a second stacking assembly.

3. The apparatus of claim 2 wherein said first stacking assembly and said first mold assembly are formed as a unified, integrated structure.

4. The apparatus of claim 2 wherein said second stacking assembly and said second mold assembly are formed as a unified, integrated structure.

5. The apparatus of claim 1 wherein:

said first mold assembly is substantially hemispherically-shaped, said second mold assembly is substantially hemispherically-shaped, said combined interior mold chamber is substantially spherically-shaped, and a portion of said distal end of said spike assembly is located at a center region of said spherically-shaped combined interior mold chamber.

6. The apparatus of claim 1 wherein:

said first joint member of said first mold assembly includes a first joint thread, and said second joint member includes a second joint thread which is complementary to said first joint thread.

* * * * *